(12) United States Patent
Katsuda et al.

(10) Patent No.: US 7,556,289 B2
(45) Date of Patent: Jul. 7, 2009

(54) GAS GENERATOR FOR AIR BAG

(75) Inventors: Nobuyuki Katsuda, Tatsuno (JP); Mikio Yabuta, Tatsuno (JP)

(73) Assignee: Daicel Chemical Industries, Ltd., Osaka (JP)

( * ) Notice: Subject to any disclaimer, the term of this patent is extended or adjusted under 35 U.S.C. 154(b) by 390 days.

(21) Appl. No.: 11/493,770

(22) Filed: Jul. 27, 2006

(65) Prior Publication Data

US 2007/0029762 A1 Feb. 8, 2007

Related U.S. Application Data

(60) Provisional application No. 60/705,186, filed on Aug. 4, 2005.

(30) Foreign Application Priority Data

Jul. 29, 2005 (JP) ............................. 2005-219879

(51) Int. Cl.
*B60R 21/23* (2006.01)
*B60R 21/26* (2006.01)
(52) U.S. Cl. ..................... 280/736; 280/743.2; 280/741
(58) Field of Classification Search ................. 280/736, 280/737, 741, 743.2
See application file for complete search history.

(56) References Cited

U.S. PATENT DOCUMENTS

| | | | | |
|---|---|---|---|---|
| 6,561,545 B2 * | 5/2003 | Greib et al. | ............... | 280/743.2 |
| 6,832,778 B2 * | 12/2004 | Pinsenschaum et al. | ..... | 280/739 |
| 6,918,614 B2 * | 7/2005 | Ryan | ........................ | 280/743.2 |
| 7,021,657 B2 * | 4/2006 | Kassman et al. | ......... | 280/743.2 |
| 7,246,819 B2 * | 7/2007 | Hofmann et al. | ............ | 280/739 |
| 2002/0125706 A1 * | 9/2002 | Greib et al. | .............. | 280/743.2 |
| 2005/0035582 A1 | 2/2005 | Kim | | |
| 2005/0212273 A1 * | 9/2005 | Thomas et al. | ............... | 280/739 |

* cited by examiner

*Primary Examiner*—Paul N. Dickson
*Assistant Examiner*—George D. Spisich
(74) *Attorney, Agent, or Firm*—Birch, Stewart, Kolasch & Birch, LLP

(57) ABSTRACT

A gas generator for an air bag includes; a housing having a gas discharge port, a first combustion chamber and a second combustion chamber, provided inside the housing and charged with a gas generating agent, a first ignition device and a second ignition device provided in the two combustion chambers, respectively, the second ignition device provided with an electric igniter, a piston, an enhancer agent, a detonator provided in the enhancer agent, opposite to the distal end of the piston, and a tether connected to the rear end portion of the piston, the tether being tied around an air bag when accommodated into an air bag module, the tether controlling an inflation direction of the air bag by fastening the inflating air bag when the first ignition device is activated, the tether being configured to be released from the piston when the second ignition device is activated.

4 Claims, 3 Drawing Sheets

GAS GENERATOR FOR AIR BAG

This nonprovisional application claims priority under 35 U.S.C. § 119(a) on Patent Application No. 2005-219879 filed in Japan on 29 Jul. 2005, and 35 U.S.C. § 119(e) on U.S. Provisional Application No. 60/705,186 filed on 4 Aug. 2005, which are incorporate by reference.

BACKGROUND OF THE INVENTION

1. Field of the Invention

The present invention relates to a gas generator for an air bag and an air bag apparatus using a gas generator for an air bag.

2. Description of Related Art

A gas generator for an air bag used in an air bag system of a vehicle may be of a dual type which is capable of inflating an air bag in two stages to enhance the passenger protection performance.

When the vehicle crashes at high speed, the air bag is inflated to a maximum degree in a single stage so that the passenger is protected, but if the air bag is inflated to a maximum degree in a single stage when the vehicle crashes at medium speed, passengers such as women and children may be injured by the inflation pressure of the air bag.

Hence, by inflating the air bag in two stages such that the air bag is inflated to a maximum degree in the second stage, the passenger protection performance can be enhanced.

US-A No. 2005-35582 may be related to the present invention.

SUMMARY OF THE INVENTION

The present invention provides a gas generator for an air bag including:

a housing having a gas discharge port;

a first combustion chamber and a second combustion chamber, provided inside the housing and charged with a gas generating agent;

a first ignition device and a second ignition device provided in the two combustion chambers, respectively, the second ignition device being provided with an electric igniter, a piston, an enhancer agent;

a detonator provided in the enhancer agent, opposite to a distal end of the piston; and a tether connected to a rear end portion of the piston, the opposite end of the tether being tied around an air bag when accommodated into an air bag module, the tether controlling an inflation direction of the air bag by fastening the inflating air bag when the first ignition device is activated, the tether being pulled and cut by movement of the piston when the second ignition device is activated.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Figure 1:
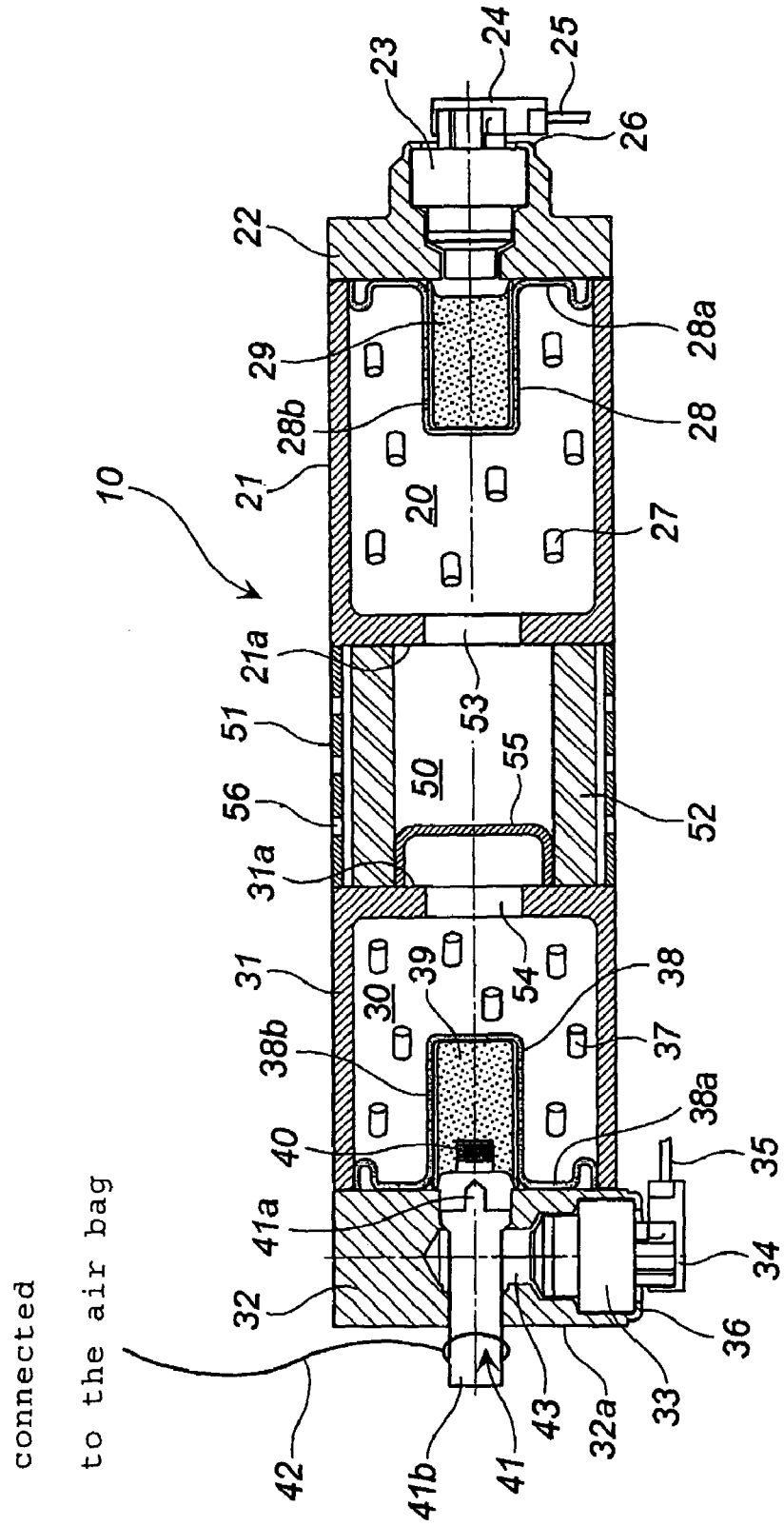
FIG. 1 shows a vertical sectional view of a gas generator for an air bag.

When an air bag apparatus is activated, an air bag is inflated in front of a seated passenger (in other words, the air bag is inflated toward the passenger), and therefore the passenger is highly likely to receive an impact from the inflation of the air bag. Hence, even when the air bag is inflated in two stages, it may be desirable, depending on the passenger, to alleviate the impact received upon inflation of the air bag.

The present invention provides a gas generator for an air bag in which an impact received by the passenger is alleviated by controlling the inflation direction of an air bag at a first stage of the inflation process, when the air bag is inflated in two stages, thereby enhancing the passenger protection performance.

In the present invention, when the air bag is inflated in two stages, the inflation direction of the air bag during a first-stage inflation is controlled to a horizontal direction (in the width direction of the body of the passenger).

In the driver side or front passenger side, an air bag module accommodating a gas generator for an air bag and an air bag is mounted in front of the passenger (in the steering wheel of the driver side or the dashboard in front of the front passenger side, for example). Therefore, the air bag inflates toward the passenger.

Hence in the present invention, the passenger protection performance is improved through the use of a means (inflation direction control means) for inflating the air bag mainly in the width direction of the passenger's body. In other words, a frontward inflation of the air bag toward the passenger can be suppressed.

In the first stage of inflation, the inflation direction control means directs the inflation mainly in the width direction of the passenger's body to suppress a frontward inflation of the air bag toward the passenger.

During a second-stage inflation of the air bag, a tether tied around the air bag is cut such that the air bag inflates mainly toward the passenger.

Upon reception of the pressure (a shock wave or a pressure increase caused by gas generation) generated through activation of an electric igniter, a piston performs a linear motion. The piston is made of a metal such as aluminum or iron. As long as the piston is rod-shaped, there are no particular limitations regarding its shape, but the tip end portion thereof preferably takes the form of an arrowhead so that it can collide effectively with a detonator when activated. The rear end portion preferably takes a form other than the arrowhead (a columnar form, for example). A groove, protrusion, or the like may be formed in the rear end portion for connecting the tether thereto.

The tether is tied around the air bag, and is therefore preferably made from a synthetic resin and shaped in string form in order to prevent damage to the air bag. The tether is preferably made from the same material as the air bag (nylon, for example).

One tether is sufficient, but two or more tethers may be used. Alternatively, two or more tethers may branch off from a single tether.

The tether is tied around the air bag at least once while the air bag is folded inside the module, and the end of the tether is fixed to the air bag module or the like. The tether is preferably tied around the air bag at least twice so that upon inflation, the air bag can be divided into three substantially equal parts in a length direction. By inflating the air bag into three equal parts in this manner, frontward inflation of the air bag toward the passenger is suppressed, and instead the air bag is inflated mainly in the horizontal direction, which is preferable.

The thickness (strength) of the tether is adjusted so that it is not cut during the first-stage inflation of the air bag, but is cut during the second-stage inflation (inflation to the maximum degree). Note that cutting of the tether includes a case in which the tether is cut midway, a case in which the tether is cut at the knot, and a case in which the knot comes loose.

The present invention preferably relates to the gas generator for an air bag, wherein a housing is cylindrical, a gas discharge port is provided in the vicinity of a central portion thereof, and two combustion chambers are disposed at the two end sides thereof.

By making the outer form of the housing cylindrical in this manner, the gas generator for an air bag is particularly suitable for use as a gas generator for an air bag for a front passenger side.

The present invention preferably relates to an air bag apparatus in which the gas generator and an air bag are accommodated in an air bag module.

The gas generator for an air bag and air bag apparatus of the present invention are particularly suitable for use in a driver side and front passenger side, but are not limited thereto, and may be also be used as a known gas generator for an air bag and a known air bag apparatus.

According to the gas generator for an air bag and air bag apparatus of the present invention, the pressure applied to a passenger during the first-stage inflation of the air bag can be alleviated, and the passenger can be sufficiently protected when the air bag is inflated to a maximum degree.

EMBODIMENT OF THE INVENTION

Figure 2:
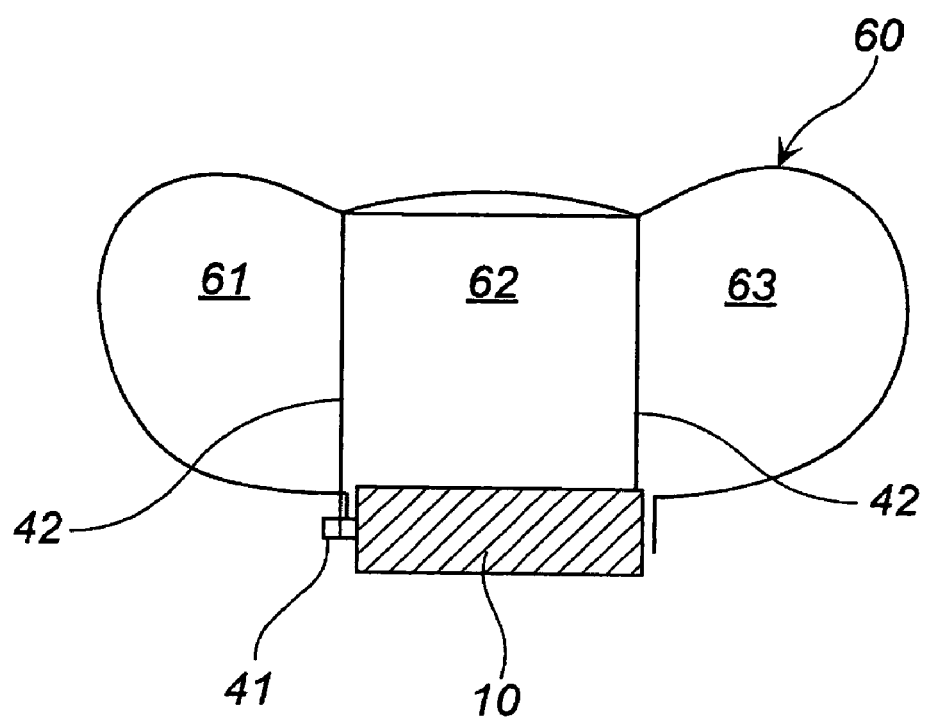
FIG. 2 illustrates an operation of an air bag apparatus using the gas generator for an air bag.
Figure 3:
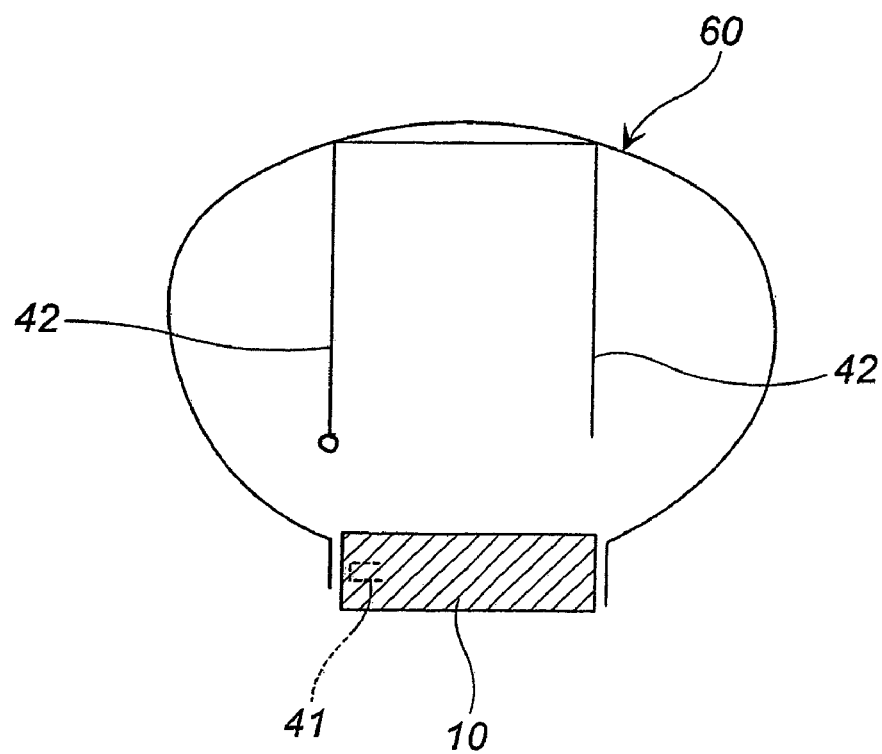
FIG. 3 illustrates an operation of the air bag apparatus using the gas generator for an air bag.

A gas generator 10 for an air bag and an air bag apparatus of the present invention will now be described using FIGS. 1, 2, and 3. FIG. 1 is a vertical sectional view of a gas generator for an air bag, and FIGS. 2 and 3 are views illustrating an operation of the gas generator for an air bag and an air bag apparatus.

The gas generator 10 is divided into three parts, a first combustion chamber 20, a second combustion chamber 30, and a filter chamber 50, and outer shells thereof are formed by a separate housing. However, the entire outer shell may be formed by a single housing (made of stainless steel or aluminum).

The outer shell of the first combustion chamber 20 is formed by a cup-shaped first combustion chamber housing 21, an opening portion of which is sealed by a boss 22. A connection portion between the first combustion chamber housing 21 and the boss 22 is fixed by welding.

A first igniter 23 is fitted into a hole provided in a central portion of the boss 22, and the first igniter 23 is fixed by caulking a peripheral edge portion 26 of the hole. A connector 24 is fitted into the first igniter 23, and a lead wire 25 is connected to a power source (a vehicle battery).

A predetermined amount of a gas generating agent 27 (having a columnar form in FIG. 1, although there are no limitations of the shape thereof) is charged into the first combustion chamber 20.

An enhancer cup 28 is disposed in the first combustion chamber 20 and fixed by a flange portion 28a when press-inserted into the first combustion chamber 20. A plurality of first flame-transferring ports 28b are provided in the peripheral surface of the enhancer cup 28, and a well-known first enhancer agent 29 is charged into the interior of the enhancer cup 28.

The outer shell of the second combustion chamber 30 is formed by a cup-shaped second combustion chamber housing 31, an opening portion of which is sealed by a boss 32. A connection portion between the second combustion chamber housing 31 and the boss 32 is fixed by welding.

A second igniter 33 is fitted into a hole provided in a central portion of the boss 32, and the second igniter 33 is fixed by caulking a peripheral edge portion 36 of the hole. A connector 34 is fitted into the second igniter 33, and a lead wire 35 is connected to a power source (the vehicle battery).

A predetermined amount of a gas generating agent 37 (having a columnar form in FIG. 1, although there are no limitations of the shape thereof) is charged into the second combustion chamber 30.

An enhancer cup 38 is disposed in the second combustion chamber 30 and fixed by a flange portion 38a when press-inserted into the second combustion chamber 30. A plurality of second flame-transferring ports 38b are provided in the peripheral surface of the enhancer cup 38, and a well-known second enhancer agent 39 is charged into the interior of the enhancer cup 38. A detonator 40 is also disposed in the interior of the enhancer cup 38.

The boss 32 is provided with a space 43 facing an ignition portion (tip end portion) of the second igniter 33 and the detonator 40, and a boss bottom surface 32a side of the space 43 is open. A piston 41 is inserted into the space 43 through this opening portion. The piston 41 takes the form of the arrowhead at a tip end portion 41a thereof, and takes a columnar form at a rear end portion 41b thereof. The tip end portion 41a is positioned within the space 43, while the rear end portion 41b protrudes to the outside through the opening portion.

The tip end portion 41a of the piston 41 directly opposes the detonator 40 in the space 43 with a gap therebetween, and a ring-shaped end portion of a tether 42 formed by nylon 6, 66, 11, 12, 610, or the like is connected and fixed to the rear end portion 41b.

When the gas generator 10 for an air bag is housed in a module together with the air bag, the tether 42 extending from the piston 41 is wound around the air bag, and the rear portion thereof is fixed to the module.

The outer shell of the filter chamber 50 is formed by a filter chamber housing 51, and a cylindrical coolant/filter 52 is disposed in the interior thereof. The two end surfaces of the coolant/filter 52 contact a ceiling surface 21a of the first combustion chamber housing 21 and a ceiling surface 31a of the second combustion chamber housing 31 respectively, such that the coolant filter 52 is pressed and fixed by the two ceiling surfaces.

The filter chamber 50 and first combustion chamber 20 communicate with each other through a first communication hole 53 provided in the ceiling surface 21a, while the filter chamber 50 and second combustion chamber 30 communicate with each other through a second communication hole 54 provided in the ceiling surface 31a. The second communication hole 54 is covered from the filter chamber 50 side by a table-shaped fire spreading prevention member 55 having an opening portion in its peripheral surface.

A plurality of gas discharge ports 56 are provided in the filter chamber housing 51, and these gas discharge ports 56 are sealed from the inside by an aluminum tape (not shown) to prevent moisture infiltration. An annular gap is provided between the gas discharge ports 56 and the outer peripheral surface of the coolant/filter 52.

Next, an operation of the air bag apparatus including the gas generator 10 for an air bag will be described using FIGS. 1, 2, and 3. The module is not shown in FIGS. 2 and 3. Note that a case in which the first igniter 23 is activated first and the second igniter 33 is activated at a slight delay will be described below.

Upon reception of an impact when the vehicle collides, an activation signal is received from a controller unit, whereby the first igniter 23 is ignited to ignite and burn the first enhancer agent 29. The flame and high-temperature gas that are generated through combustion of the first enhancer agent 29 are ejected through the first flame-transferring port 28b into the first combustion chamber 20, causing the first gas generating agent 27 to ignite and burn such that high-temperature gas is generated.

The high-temperature gas that is generated through combustion of the first gas generating agent 27 flows through the first communication hole 53 into the filter chamber 50, and through the action of the fire spreading prevention member 55, the high-temperature gas is prevented from flowing through the second communication hole 54 into the second combustion chamber 30 to ignite and burn the second gas generating agent 37. The high-temperature gas is filtered and cooled by the coolant/filter 52, and then discharged through the gas discharge ports 56 to inflate an air bag 60 formed by nylon 6, 66, 11, 12, 610, or the like.

At this time, the tightening action of the tether 42 tied around the air bag 60 in advance causes the air bag 60 to expand in a horizontal direction as shown in FIG. 2, thereby suppressing inflation in a frontward direction toward the seated passenger. By tying the tether 42 such that the air bag 60 is divided into three substantially equal parts (air bag parts 61, 62, 63) when inflated, the effect of suppressing inflation in the frontward direction toward the seated passenger can be enhanced.

By inflating the air bag in this manner during the first-stage inflation, the passenger can be restricted and protected over a wider area, and the passenger can also be prevented from receiving excessive pressure upon inflation of the air bag.

Next, the second igniter 33 is ignited such that the internal pressure of the space 43 rises. As a result, the piston 41 is pushed so as to collide with the detonator 40, whereby the detonator 40 is ignited so as to ignite and burn the second enhancer agent 39. The flame and high-temperature gas generated by combustion of the second enhancer agent 39 is ejected through the second flame-transferring port 38b into the second combustion chamber 30, causing the second gas generating agent 37 to ignite and burn such that high-temperature gas is generated.

The high-temperature gas that is generated by combustion of the second gas generating agent 37 flows through the second communication hole 54 into the filter chamber 50, where it is filtered and cooled by the coolant/filter 52, and is then discharged through the gas discharge ports 56 to further inflate the air bag 60.

At this time, the connection between the tether 42, tied around the air bag 60, and the tip end portion 41a of the piston is released by the inflation pressure of the air bag 60 during second-stage inflation, as shown in FIG. 3, and hence the air bag 60 is mainly inflated in front of the seated passenger.

Depending on the state in which the vehicle collides, only the first igniter 23 may be activated, in which case the inflation state shown in FIG. 2 is realized, or the first igniter 23 and second igniter 33 may be activated simultaneously, in which case the inflation state shown in FIG. 3 is realized. In all cases, the passenger is protected sufficiently.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator for an air bag, comprising:
a housing having a gas discharge port,
a first combustion chamber and a second combustion chamber, provided inside the housing and charged with a gas generating agent,
a first ignition device and a second ignition device provided in the two combustion chambers, respectively,
the second ignition device provided with an electric igniter, a piston, an enhancer agent,
a detonator provided in the enhancer agent, opposite to the distal end of the piston, and
a tether being externally tied around an air bag accommodated into an air bag module, and one end of the tether being connected to the piston,
the tether controlling an inflation direction of the air bag by fastening the inflating air bag when the first ignition device is activated, the tether being configured to be released from the piston by movement of the piston when the second ignition device is activated.

2. The gas generator for an air bag according to claim 1, wherein the housing is cylindrical, the gas discharge port is provided in the vicinity of a central portion thereof, and the two combustion chambers are disposed at the two end sides thereof.

3. An air bag apparatus, wherein the gas generator according to claim 2 and an air bag are accommodated in an air bag module.

4. An air bag apparatus in which the gas generator according to claim 1 and an air bag are accommodated in an air bag module.

* * * * *